United States Patent [19]

Suzuki et al.

[11] Patent Number: 5,199,022
[45] Date of Patent: Mar. 30, 1993

[54] DISK HAVING DATA MEMORIZING PORTION INCLUDING LAND-SHAPED AND GROOVE-SHAPED AREAS, AND WRITING/READING APPARATUS FOR THE SAME

[75] Inventors: Katsumi Suzuki, Tokyo; Tsuneshi Yokota, Kawasaki; Tomohisa Yoshimaru, Yokohama, all of Japan

[73] Assignee: Kabushiki Kaisha Toshiba, Kawasaki, Japan

[21] Appl. No.: 858,620

[22] Filed: Mar. 27, 1992

[30] Foreign Application Priority Data

Jun. 28, 1991 [JP] Japan ................................ 3-183685

[51] Int. Cl.⁵ .............................................. G11B 13/04
[52] U.S. Cl. .................................. 369/275.1; 369/13; 360/59; 360/114; 365/122
[58] Field of Search ............... 369/275.1, 275.3, 275.2, 369/284, 13; 360/59, 114; 365/122

[56] References Cited

U.S. PATENT DOCUMENTS

| | | | |
|---|---|---|---|
| 4,771,347 | 9/1988 | Horimai et al. | 369/13 |
| 4,923,765 | 5/1990 | Takayama et al. | 369/13 |
| 5,051,970 | 9/1991 | Ishii et al. | 369/13 |
| 5,143,798 | 9/1992 | Fujii | 369/275.2 |

OTHER PUBLICATIONS

Nikkei Electronics 1991, 3.4 (No. 521) p. 92.

*Primary Examiner*—Constantine Hannaher
*Assistant Examiner*—Kiet T. Nguyen
*Attorney, Agent, or Firm*—Finnegan, Henderson, Farabow, Garrett and Dunner

[57] ABSTRACT

A magneto-optical data reading member includes a transparent disk substrate, and land-shaped areas formed on the disk substrate in a spiral manner so as to be parallel with each other, and groove-shaped areas formed to be stepped with respect to the land-shaped areas, wherein each of the land-shaped and groove-shaped areas has, in a surface region thereof, a first magnetic film for reading data having a predetermined Curie temperature and a predetermined magnetic coercive force, and a second magnetic film for reading data, formed on the first magnetic film, having a Curie temperature higher than the predetermined Curie temperature and a magnetic coercive force higher than the predetermined magnetic coercive force, and having a plurality of memory pits in series according to the information data to be recorded.

17 Claims, 6 Drawing Sheets

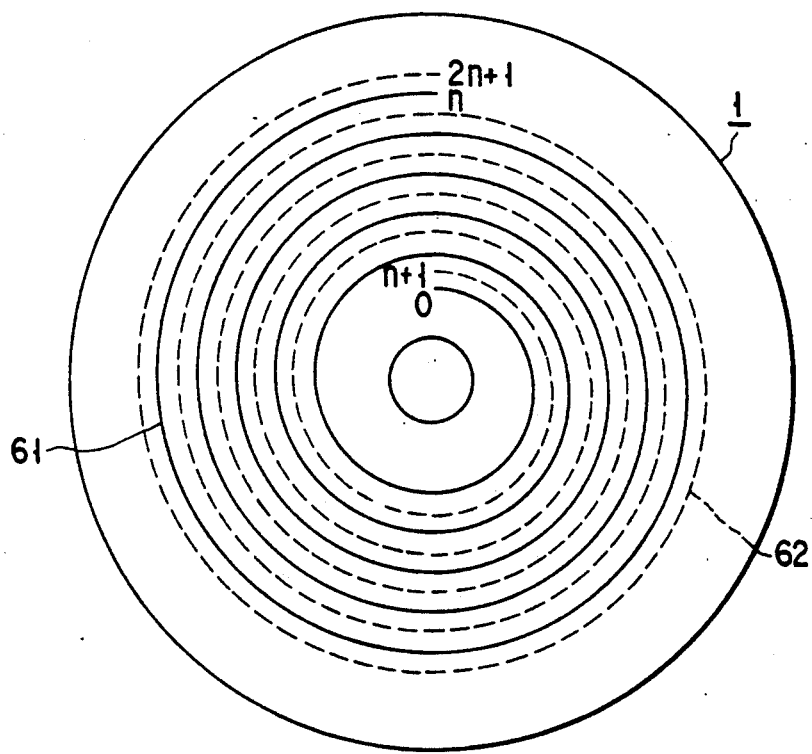
F I G. 4

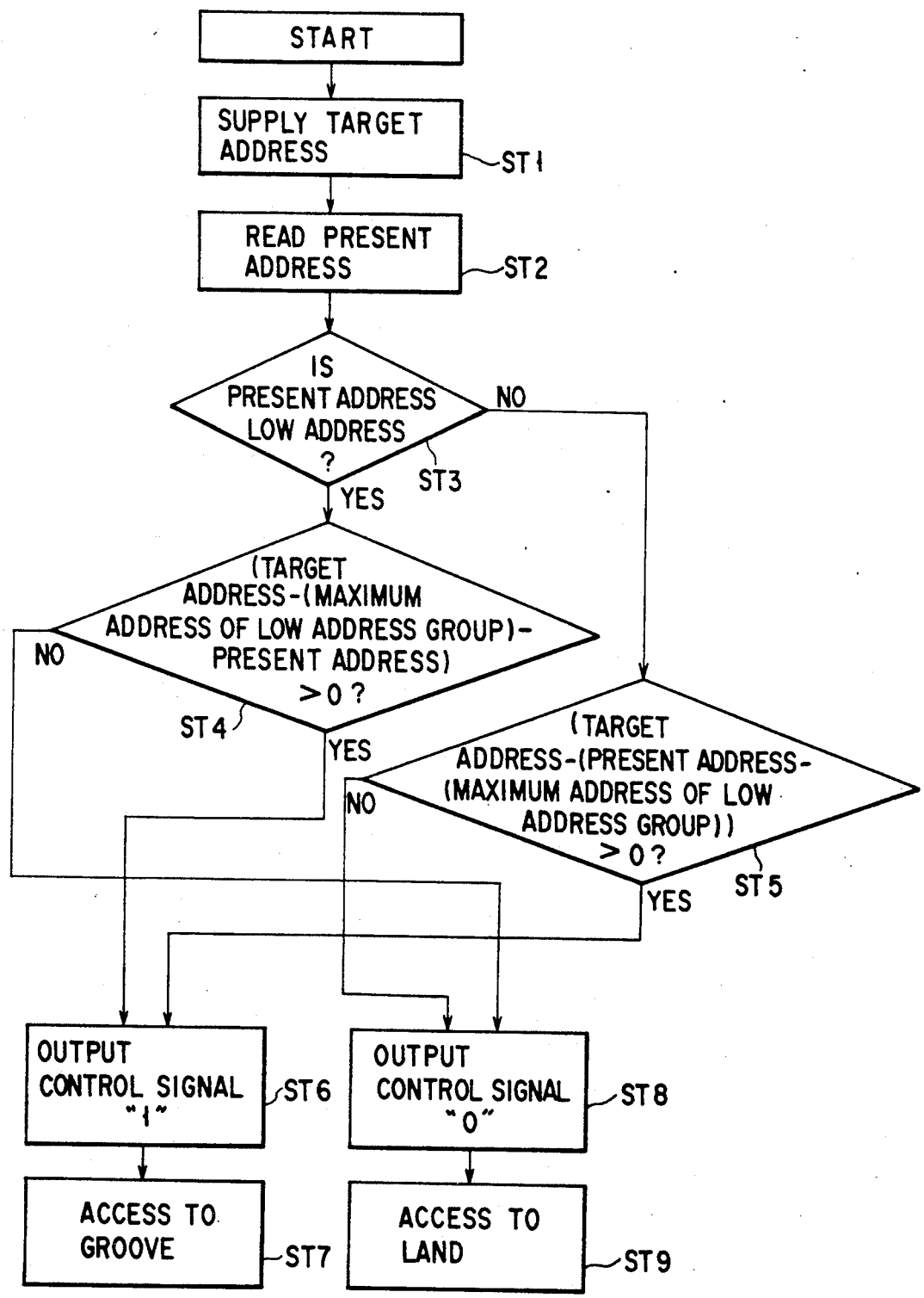
F I G. 5

DISK HAVING DATA MEMORIZING PORTION INCLUDING LAND-SHAPED AND GROOVE-SHAPED AREAS, AND WRITING/READING APPARATUS FOR THE SAME

BACKGROUND OF THE INVENTION

1. Field of the Invention

The present invention relates to a photomagnetic data memorizing apparatus, e.g., a photomagnetic data memorizing disk apparatus capable of performing high-density data write.

2. Description of the Related Art

Conventionally, to write data on a photomagnetic disk, a laser beam is radiated on a magnetic film while a magnetic field is applied to the magnetic film, so that part of the film the temperature of which is increased to a predetermined value (Curie temperature) or more and which has thus lost its coercive force is magnetized, thereby forming a memory pit. To read data, a low-temperature laser beam necessary for data read is spot-radiated, and light reflected by the disk surface is read.

However, the size of a memory pit which can be read is limited by a detecting limit determined by a laser wavelength and a numerical aperture of a lens.

A photomagnetic disk in which the magnetic film has a two-layered structure is experimentally manufactured. One of the two layers is used as a mask to cover pits other than one memory pit from which data is to be read, so that data can be read from memory pits formed at a smaller pitch than the spot diameter of the read beam. In this case, the write wavelength is a short wavelength of less than half the conventional detection limit, and the resolution is increased to twice or more.

According to this technique, a temperature difference is present within a beam spot (Gaussian distribution) formed by beam radiation during reading, and pit reading is enabled only from a high-temperature area within the beam spot. Therefore, the same effect as that obtained when the read beam spot area (diameter) is decreased can be obtained accordingly, and high-density data write can be realized by using the optical system of an existing photomagnetic disk apparatus.

However, although high-density data write can be realized by using the existing laser optical system, no attempt has been so far made to put this idea in practical use, and associated techniques for further increasing the data write density are not sufficient.

SUMMARY OF THE INVENTION

It is an object of the present invention to provide a magneto-optical data reading member having a higher data write density and a reading/writing apparatus for the same.

According to the present invention, there is provided a magneto-optical data reading member including a transparent disk substrate, land-shaped areas and groove-shaped area formed on the disk substrate in a spiral manner so as to be parallel with each other, and the grooved-shaped areas formed to be stepped with respect to the land-shaped areas, wherein each of the land-shaped and groove-shaped areas has, in a surface region thereof, a first magnetic film (read) having a predetermined Curie temperature and a predetermined magnetic coercive force, and a second magnetic film (write), formed on the first magnetic film, having a Curie temperature higher than the predetermined Curie temperature and a magnetic coercive force higher than the predetermined magnetic coercive force, and having a plurality of memory pits (P) in series for memorizing data.

According to the present invention, with the structure described above, the first magnetic film having the low Curie temperature and the low coercive force is initialized by an initializing magnetic field generating means of a data reading apparatus. Then, even if the plurality of memory pits are formed at a high density, pits other than a single target memory pit are masked by the first magnetic film from a large laser beam spot. As a result, when data is to be read, the laser beam is not radiated on the plurality of memory pits at once, and high-density memory pits can thus be formed. Furthermore, since the step between the land-shaped and groove-shaped areas is detected by the data reading apparatus, tracking is enabled. Since an area indicating a tracking position need not be formed, unlike in the conventional disk, the memory pits can be formed at a higher density.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows track address allocation of grooves and lands of the photomagnetic disk according to the present invention;

FIG. 5 is a flow chart showing the steps in accessing an address of the photomagnetic disk by the reading apparatus according to the present invention.

DETAILED DESCRIPTION OF THE PREFERRED EMBODIMENT

A preferred embodiment of the present invention will be described with reference to the accompanying drawings.

Figure 1:
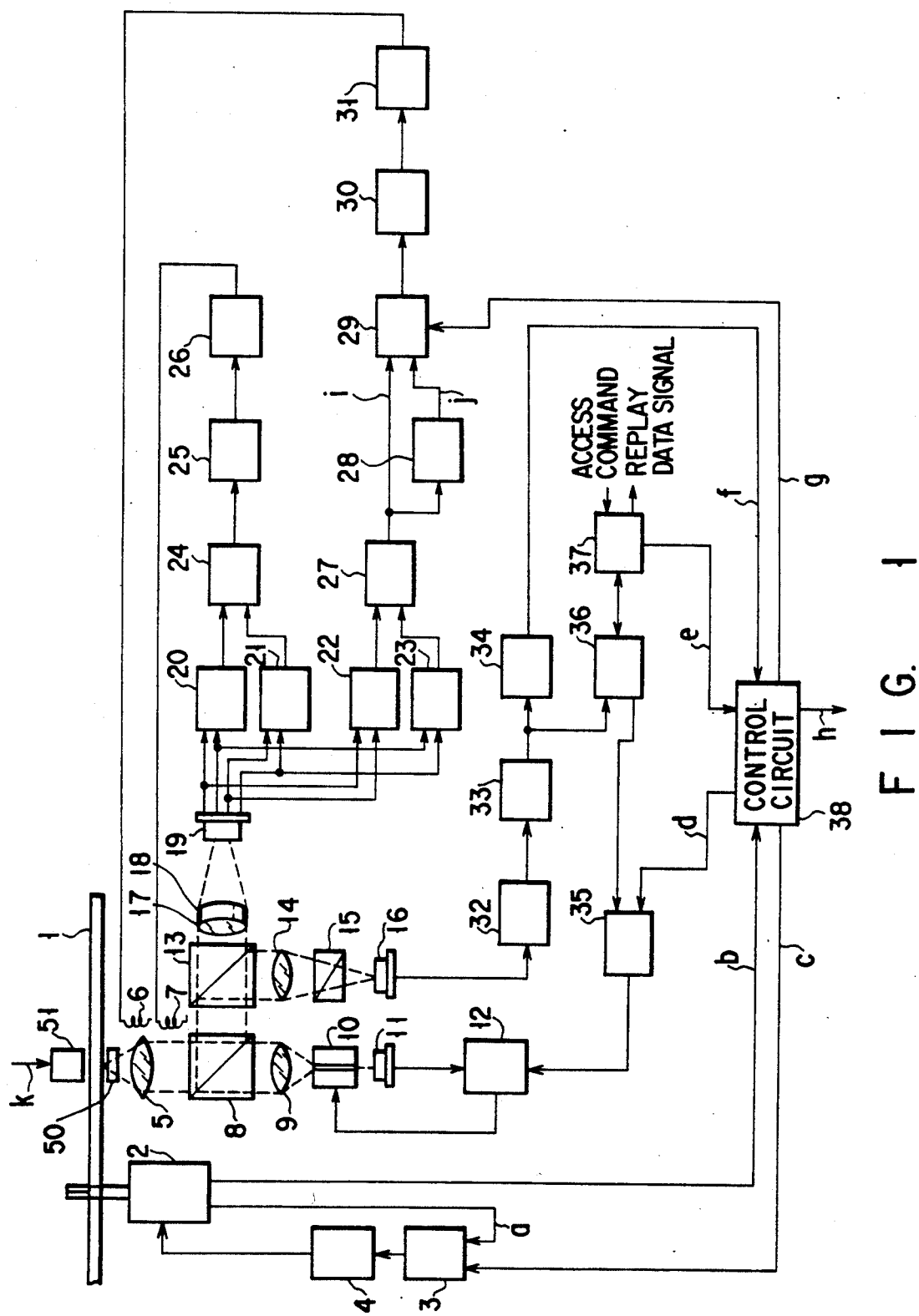
FIG. 1 is a diagram schematically showing a photomagnetic data memorizing disk reading apparatus according to an embodiment of the present invention.

FIG. 1 schematically shows a photomagnetic disk reading apparatus according to the present invention.

A photomagnetic disk 1 is driven by, e.g., a spindle motor 2.

Figure 2:
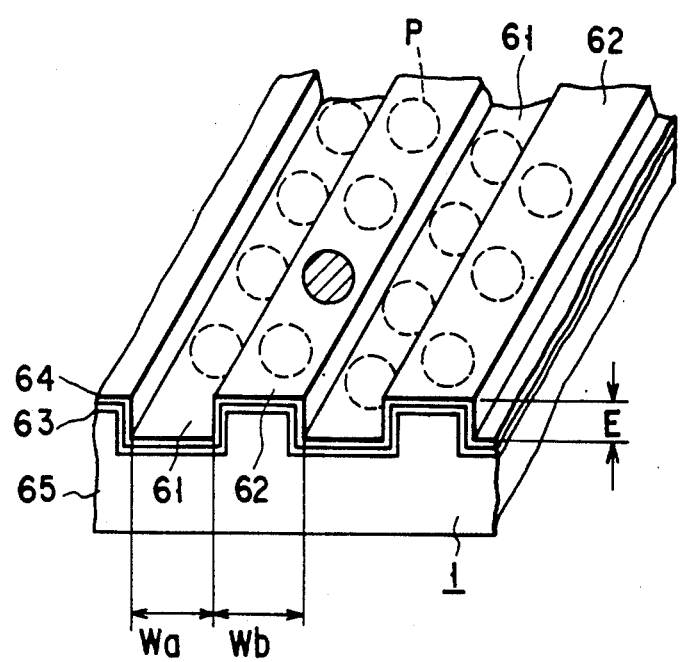
FIG. 2 is a perspective view showing part of the structure of the photomagnetic disk according to the present invention.

Spiral guide grooves are formed in the surface of the photomagnetic disk 1, as shown in FIG. 2. The recessed portion of a guide groove is referred to as a groove 61, and the projecting portion between adjacent grooves 61 is referred to as a land 62. In this case, a width Wa of the groove 61 and a width Wb of the land 62 are set to about 1 : 1.

A photomagnetic data memorizing film (magnetic film) of a two-layered structure including a read layer 63 and a write layer 64 is formed on the surface of the disk 1. In the photomagnetic data memorizing film, the read and write layers 63 and 64 are formed on a substrate 65 in this order.

In the photomagnetic disk 1, data read/write operations are performed for both of the groove 61 and the land 62.

The spindle motor 2 is connected to a phase-locked loop (PLL) control circuit comprising a phase comparator 3 and a motor driver 4. In accordance with a clock signal c output from a control circuit 38 and a pulse a output from the spindle motor 2, the spindle motor 2 is driven to be precisely synchronized with the clock signal c.

The control circuit 38 includes a microprocessor for controlling the overall apparatus, a ROM, and a RAM.

The control circuit 38 is synchronized with a revolution pulse b output from the spindle motor 2 every revolution to drive a track/sector counter (not shown). Therefore, when the control circuit 38 outputs a track/sector address d to drive a semiconductor laser 10 via a modulating circuit 35 and a laser power control circuit 12, continuous track address data can be supplied to the photomagnetic disk 1. This will be described later in more detail.

A laser beam from the semiconductor laser 10 is collimated by a collimator lens 9 and transmitted to a half mirror 8. The collimated beam is focused by an objective lens 5 to irradiate the photomagnetic data memorizing film on the photomagnetic disk 1 with a beam spot.

A read/write magnetic field generating means 51 comprising an electromagnet or a permanent magnet is arranged to oppose this optical system intervening the photomagnetic disk 1 therebetween. The magnetic field generating means 51 can invert the polarity of the magnetic field in accordance with a signal k for data (memory pit) write or erasure to or from the write layer 64. The magnetic field generating means 51 can be provided on the same side as the objective lens 5.

An initializing magnetic field generating means 50 is arranged before the read beam spot to a read track which is focused by the objective lens 5. The magnetic field generating means 50 initializes the read layer 63 having a weak coercive force so that the read layer 63 serves as a mask covering pits other than a single memory pit from which data is to be read.

Light reflected by the photomagnetic disk 1 is reflected by the half mirror 8 through the objective lens 5. Light reflected by the half mirror 8 is split into transmitted light and reflected light by a half mirror 13. The transmitted light passes through a compound lens comprising a convex lens 17 and a cylindrical lens 18 and is guided to a 4-split photodiode 19. Light incident on the 4-split photodiode 19 is converted to an electrical signal.

Using this electrical signal, a focus error signal is detected by an error amplifier 24 through preamplifiers 20 and 21 in accordance with the known astigmatism scheme. Then, the focus error signal passes through a phase compensating circuit 25 for focusing servo stabilization and drives a focusing coil 7 of a lens actuator by a driver 26, thereby performing focusing control of the objective lens 5.

A track error signal i is detected by an error amplifier 27 in a similar manner through preamplifiers 22 and 23 in accordance with the known push-pull scheme. The track error signal i is supplied to an analog switch 29 together with its inverted track error signal j with the polarity being inverted by an inverting amplifier 28. The analog switch 29 selects either the track error signal i or the inverted track error signal j in accordance with a tracking polarity switching control signal g from the control circuit 38, and outputs a selected signal.

Then, a tracking coil 6 of the lens actuator is driven by a driver 31 via a phase compensating circuit 30 for tracking servo stabilization, thereby performing tracking control for the groove 61 or land 62 by the objective lens 5. More specifically, when the track error signal i is selected by the analog switch 29, the objective lens 5 is controlled so that groove tracking is performed, i.e., so that the beam spot follows the groove 61. When the inverted track error signal j having the inverted polarity is selected, the objective lens 5 is controlled so that land tracking is performed, i.e., so that the beam spot follows the land 62.

In this manner, the inverting amplifier 28 is prepared and the polarity in the tracking control loop is switched by the analog switch 29, so that tracking can be performed for both the groove (the recessed portion of the photomagnetic data memorizing film formed by the guide groove) 61 and the land (the projecting portion of the photomagnetic data memorizing film formed by the guide groove) 62.

In this embodiment, since the widths of the groove 61 and the land 62 are set to about 1 : 1, groove tracking and land tracking can be easily performed by simply switching the polarity. As a result, data read/write can be performed for both of the groove 61 and the land 62.

To read data, read light reflected by the photomagnetic disk 1 at a Kerr rotating angle in accordance with a memory pit is reflected by the half mirror 13 and focused by a condenser lens 14. The focused light is incident on a photodiode 16 via an analyzer 15 for reading a photomagnetic data write signal and is then converted to an electrical signal.

An output from the photodiode 16 is amplified by a signal processing circuit 32 and binarized. A clock signal is separated from the binary signal, and the resultant signal is decoded by a decoding circuit 33. Regarding an address data portion, a present address signal f is read by an address read circuit 34 and supplied to the control circuit 38.

The decoded data signal decoded by the decoding circuit 33 is subjected to error correction by an error correcting circuit 36 and output to an external host system (not shown) via an interface circuit 37. Data read is thus performed.

Regarding access to a target track, an access command from the host system is received via the interface circuit 37, and a difference between a target address signal e and the present address signal f and an access direction are calculated by the control circuit 38. Then, a control signal h from the control circuit 38 for designating the access direction, the target address signal e, and the present address signal f control an access mechanism (not shown) comprising a linear motor. The optical system (optical head) mounted on the access mechanism is caused to access to the photomagnetic disk 1 in the radial direction, thereby performing accessing.

To write data, data to be written is received from the interface circuit 37, and an error correction code is added to this data by the error correcting circuit 36. The resultant data is subjected to digital modulation appropriate for data write by the modulating circuit 35 and is then supplied to the laser power control circuit 12. A memory pit is written in the groove 61 or land 62 of the photomagnetic disk 1 by a laser beam generated by the semiconductor laser 10.

Note that reference numeral 11 denotes a photodiode for monitoring an output from the semiconductor laser 10. The laser power control circuit 12 is stabilized by the output from the semiconductor laser 10.

The structure of the photomagnetic disk 1 used in the present invention and the principle of reading data from the same will be described.

Figure 3A:
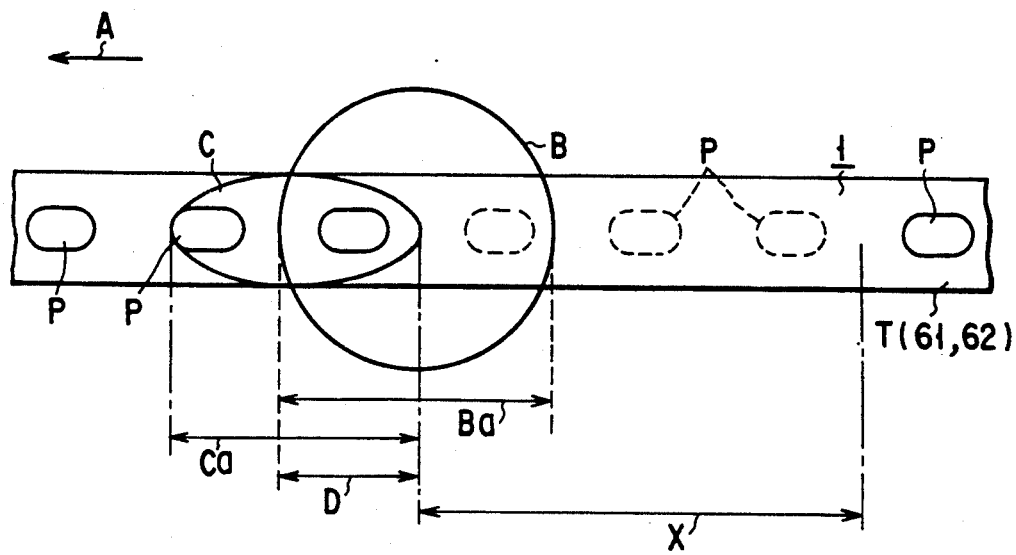
FIGS. 3A and 3B are views for explaining the structure of the photomagnetic disk according to the present invention and a principle of reading data from the same.
Figure 3B:
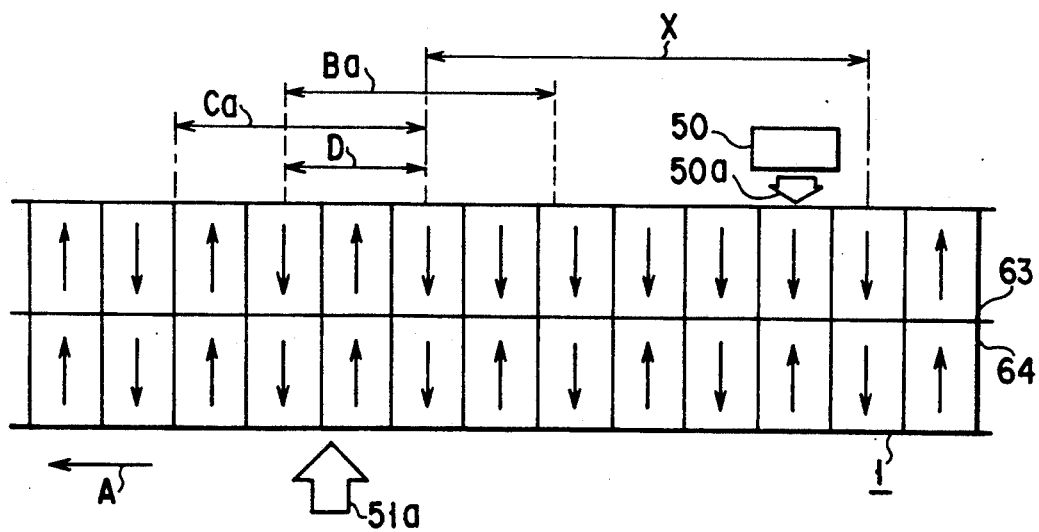

Referring to FIG. 3B, the write layer 64 of the photomagnetic disk 1 rotated in a direction of an arrow A in FIG. 3B is a film made of, e.g., a TbFeCo-based material having a high coercive force. The Curie temperature of the write layer 64 is set to almost the same as that of the magnetic film of an ordinary photomagnetic disk. That is, when a laser beam is radiated with a data write power, the temperature of the write layer 64 is increased over the Curie temperature and thus magnetization is lost. As the temperature is decreased, the write layer 64 is magnetized in the direction of a write magnetic field of the read/write magnetic field generating means 51. After the write layer 64 is restored to the room temperature, the new magnetization direction is held.

The read layer 63 is a film made of, e.g., a GdFeCo-based material. The read layer 63 has a lower Curie temperature than that of the write layer 64 and has a coercive force lower than that of the write layer 64. Therefore, when a laser is radiated on the read layer 63 with a data read power for a sufficient period of time, magnetization inversion is caused in the read layer 63, and the magnetization direction can be reversed by an initializing magnetic field 50a from the initializing magnetic field generating means 50.

To read data, the magnetization direction of the read layer 63 is uniformed by the initializing magnetic field 50a, so that all the memory pits P along a read track (the groove 61 or land 62) T are covered by the read layer 63. In FIG. 3A, the memory pits P represented as broken ellipses are masked (an area indicated by X).

Only one pit P smaller than a diameter Ba of a spot B is unmasked by utilizing heat of the read beam spot B, thereby performing signal read.

That is, when the memory pits P magnetized in the upward direction undergo the initializing magnetic field 50a, only the read layer 63 having a small coercive force is forcibly magnetized in the downward direction. The memory pits P magnetized in the upward direction are thus masked by the layer 63.

When the portion X of the masked memory pits P reaches the read beam spot B, the temperature of this portion is increased by radiation of the laser beam. A portion (an elliptic area C) Ca irradiated with the read beam spot B for a long period of time is heated to a high temperature, and the coercive force of the read layer 63 is decreased. At this time, when the write layer 64 includes memory pits P magnetized in the upward direction, its magnetization is transferred to the read layer 63 because of the exchange coupling force between the layers 63 and 64 and the weak read magnetic field 51a. As a result, the mask formed by the initializing magnetic field 50a is removed from this portion (a detection area D).

In this manner, the memory pits P of a right-side region of the read beam spot B on which the laser beam is started to radiate are kept masked, and only the detection area D whose coercive force is decreased by long-time radiation is unmasked by transfer of the magnetization. As a result, the apparent diameter Ba of the beam spot B effective for read of the memory pit P can be made small. Thus, high-resolution data read is enabled.

The diameter of the memory pit P for data write can be made sufficiently smaller than that of the beam spot by appropriately selecting a write enable temperature (the Curie temperature) and a temperature distribution of the beam spot of the laser beam (close to the Gaussian distribution).

FIG. 4 shows track address allocation of the groove 61 and the land 62 of the photomagnetic disk 1.

In this embodiment, continuous addresses 0 to n are given to the spiral groove 61 as track addresses, and continuous addresses n+1 to 2n+1 are given to the land 62 as track addresses.

When the track addresses are grouped into those (high address group) 0 to n for the groove 61 and those (low address group) n+1 to 2n+1 for the land 62, intergroove track access in the groove 61 and interland track access in the land 62 can be simplified and facilitated.

More specifically, groove tracking is started from the innermost track of the photomagnetic disk 1, and the track/sector address d based on the count from the track/sector counter which counts in synchronism with the revolution pulse b supplied from the spindle motor 2 is output from the control circuit 38. The semiconductor laser 10 is driven via the modulating circuit 35 and the laser power control circuit 12, thereby supplying continuous track address data 0 to n to the groove 61 of the photomagnetic disk 1 by a single operation.

Similarly, land tracking is started from the innermost track of the photomagnetic disk 1, and the necessary track/sector address d is output from the control circuit 38 to drive the semiconductor laser 10 via the modulating circuit 35 and the laser power control circuit 12, thereby supplying continuous track address data n+1 to 2n+1 to the land 62 of the photomagnetic disk 1 by a single operation while grouping the address data.

Read/write with respect to the groove 61 and read/write with respect to the land 62 can be performed separately in this manner. Therefore, a single photomagnetic disk 1 can be treated as two separate recording media respectively performing groove memorization and land memorization.

The operation of the photomagnetic data memorizing disk apparatus having the above arrangement will be described.

Group access between the groove 61 and the land 62 will be described first. FIG. 5 is a flow chart showing a sequence with which the disk reading apparatus according to the present invention determines to access either the land or groove area of the disk.

Assume that a present address signal f read by the address read circuit 34 is input to the control circuit 38 (ST2). Then, determination is performed as to whether the present address signal f belongs to the low address group of the land 62 or the high address group of the groove 61 (ST3).

If the present address signal f belongs to the low address group (YES in ST3), a calculation of ((target address)—(maximum address of low address group))—(present address) is performed by the control circuit 38 (ST4). If the result is a positive value, the control circuit 38 outputs "1" as a control signal h for determining the access direction (ST6). If the calculation result is a negative value (NO in ST4), the control circuit 38 outputs "0" as the control signal h (ST8).

If the present address signal f belongs to the high address group (NO in ST3), a calculation of (target address)—((present address) - (maximum address of low address group)) is performed (ST5). If the result is a positive value, the control circuit 38 outputs "1" as the control signal h (ST6); if negative, it outputs "0" as the control signal h (ST8).

The group access direction as to access to either the groove 61 or land 62 of the photomagnetic disk 1 is determined in accordance with whether the control signal h obtained in this manner is "0" or "1" (ST7 and ST9).

In this embodiment, the width Wa of the groove 61 and the width Wb of the land 62 are set to about 1 : 1, as shown in FIG. 2. Thus, the amount of light reflected by the groove 61 and that reflected by the land 62 are deemed to be almost the same. This is very convenient for signal read when read/write data with respect to the groove 61 and the land 62 is performed.

Furthermore, an emission wavelength (read/write laser wavelength) λ of the semiconductor laser 10 as a light source for performing data read/write with respect to the photomagnetic disk 1 in which the widths of the groove 61 and the land 62 are set to about 1 : 1 is set to about 8E' or less when a depth E' of an optical groove (guide groove) of the photomagnetic disk 1 is E'=nE where n is the refractive index of the substrate 65. Then, the track error signal can be set almost maximum, and a decrease in reflected light amount obtained by the groove 61 and the land 62 can be decreased, so that a signal having a high S/N ratio can be obtained by the photodiode 11.

To write data, a write beam spot is accessed to a target track where data is to be written, and an error correction code is added by the error correcting circuit 36 to the data to be written which is received via the interface circuit 37. The resultant data is subjected to digital modulation appropriate for data write by the modulating circuit 36, and is then supplied to the laser power control circuit 12. A memory pit P is written in the groove 61 or land 62 of the photomagnetic disk 1 by the laser beam generated by the semiconductor laser 10, thereby writing data.

To read data, a read beam is radiated onto a target track from which data is to be read, and read light reflected by the photomagnetic disk 1 at a Kerr rotating angle in accordance with a memory pit P is reflected by the half mirror 13 and focused by the condenser lens 14. The focused light is incident on the photodiode 16 via the analyzer 15 and is then converted to an electrical signal. An output from the photodiode 16 is amplified by the signal processing circuit 32, binarized, and decoded by the decoding circuit 33. A replay data signal obtained by the decoding circuit 33 is subjected to error correction by the error correcting circuit 36 to be restored to the original data. As a result, data written in the groove 61 or land 62 is replayed.

Figure 6:
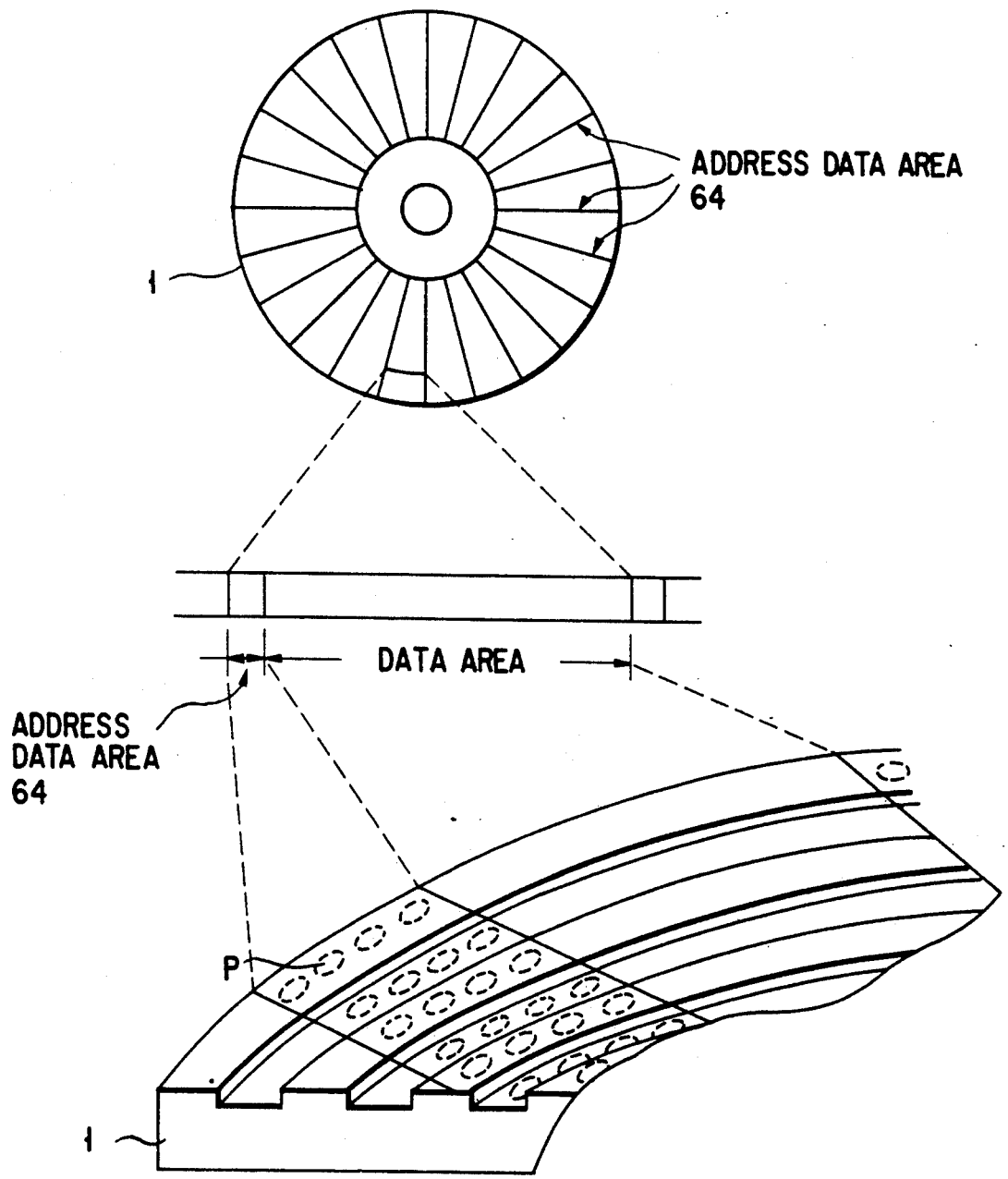
FIG. 6 is a view for explaining the distribution of the address data area on the disk.

FIG. 6 is a view for explaining the distribution of the address data area on the disk. In this figure, reference number 1 is photomagnetic disk, 64 are areas for memorizing address data of the disk data, the address data areas formed in every determined space. In this area 64, address data, for example, track numbers and section numbers are memorized in each of groove areas, land areas in the same manner of memorizing data.

As described above, in this embodiment, data of the same memory state can be written in both the groove and the land.

More specifically, the spiral guide groove is formed in the photomagnetic disk of a two-layered structure including read and write layers, the widths of the groove and the land defined by the guide groove are set to be almost the same, and data is written in both the groove and the land. Address data is written by forming a pit by the laser beam in the same manner as data write. Then, a signal of a memory pitch smaller than the diameter of the read beam spot can be replayed, and the track pitch can be decreased to half. As a result, both the track and pit pitches can be set to have a high density, and higher-density data write can be realized.

The present invention is not limited to the embodiment described above. It is apparent that various changes and modifications may be made without departing from the spirit and scope of the invention.

As has been described above in detail, according to the present invention, there is provided a photomagnetic data memorizing apparatus which enables high-density data memorization, by using the existing laser optical system, on a recording medium in which the magnetic film has a two-layered structure, and one of the two layers is used as a mask to cover pits other than a memory pit from which data is to be read, so that memory pits written at a smaller pitch than the beam spot diameter can be read.

A tracking groove need not be formed, unlike in a conventional photomagnetic disk, and tracking can be performed by optically detecting a step between a land area and a groove area. Since the entire area on the disk can be used for data memorization, a photomagnetic disk capable of high-density data memorization can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magneto-optical data recording member comprising:
   a transparent disk substrate; and
   land-shaped areas and groove-shaped areas formed on the disk substrate in a spiral manner so as to be parallel with each other, and the groove-shaped areas formed to be stepped with respect to land-shaped area;
   wherein each of the land-shaped and groove-shaped areas has, in a surface region thereof, a first magnetic film for reading data and a second magnetic film for recording data, the first magnetic film having a predetermined Curie temperature and a predetermined magnetic coercive force, and the second magnetic film for recording data, formed on the first magnetic film, having a Curie temperature higher than the predetermined Curie temperature and a magnetic coercive force higher than the predetermined magnetic coercive force, and having a plurality of memory pits in series according to the information data to be recorded, thereby enabling to write data and to read data in each of the land-shaped and groove-shaped areas.

2. A disk according to claim 1, wherein the land-shaped and groove-shaped have substantially the same widths in a radius direction toward the center of circle of the disk substrate.

3. A disk according to claim 1, wherein the memory pits according to the data to be recorded in the land-shaped areas and the groove-shaped areas are continuously formed.

4. A disk according to claim 1, wherein each of the land-shaped areas and the groove-shaped areas has continuous address data.

5. A disk according to claim 1, wherein the stepped formation between the groove-shaped and the second magnetic film has a dimension of about ⅛ the width of the laser wavelength.

6. A disk according to claim 1, wherein the first magnetic film at least contains of Gd, Fe and Co elements.

7. A disk according to claim 1, wherein the second magnetic film at least contains of Tb, Fe and Co elements.

8. A disk according to claim 1, wherein the step is formed continuously from a beginning to an end of each of the spiral land-shaped areas and the groove-shaped areas.

9. A recording member according to claim 1, wherein the groove-shaped area is assigned to a first address group containing addresses 0 to n, where n is a positive integer; wherein the land-shaped area is assigned to a second address group containing addresses n+1 to 2n+1; wherein the first address group of said groove-shaped area and the second address group of said land-shaped area have coaxially-arranged spiral forms with respect to a rotational center of said disk substrate; and wherein the first address group of said groove-shaped area is separated from the second address group of said land-shaped area so that reading/writing of data to said groove-shaped area can be independent of reading/writing of data to said land-shaped area.

10. A disk reading/writing apparatus using magnetooptical data recording member which comprises a light-transmitting disk-shaped supporting member, and land-shaped areas and groove-shaped areas formed on the disk in a spiral manner so as to be parallel with each other, and the groove-shaped areas formed to be stepped with respect to land-shaped area, wherein each of the land-shaped and groove-shaped areas has, in a surface region thereof, a first magnetic film for reading data and a second magnetic film for recording data, wherein the first magnetic film has a predetermined Curie temperature and a predetermined magnetic coercive force, wherein the second magnetic film, formed on the first magnetic film, has a Curie temperature higher than the predetermined Curie temperature and a magnetic coercive force higher than the predetermined magnetic coercive force, and wherein the land-shaped and groove-shaped areas have a plurality of memory pits serially arranged in accordance with data to be recorded, thereby enabling to write data and to read data in each of the land-shaped and groove-shaped areas, the disk reading/writing apparatus comprising:

means for rotating the disk loaded on the apparatus with a predetermined speed;

means, arranged close to a predetermined memory pit of the disk loaded on the apparatus, for initializing the first magnetic film under a predetermined condition;

means, arranged close to the predetermined memory pit of the disk loaded on the apparatus, for generating an auxiliary magnetic field used either for writing data in the memory pit of the disk and erasing data written in the memory pit;

means, arranged close to the initializing means, for radiating pulsed light beam to the disk according to the data to be recorded, so as to detect reflected light beam of the radiated light beam, said reflected light beam being converted into an electrical signal;

means for moving a position of the radiating means to follow a position of the memory pit formed on the disk;

means for supplying said radiating means with an information data signal delivered from an exterior of the apparatus in order to write a content of the information data signal on the disk;

means for processing, in a predetermined manner, data obtained from the reflected light beam detected by said radiating means, so as to output the processed data to the exterior of the apparatus; and means for controlling operation of said rotating means, said initializing means, said generating means, said radiating means, said moving means, said supplying means, and said processing means.

11. A reading/writing apparatus according to claim 10, wherein said moving means includes means for selecting either one of the land shaped and groove-shaped areas, the selected one serving the position of said radiating mean to follow the position of said memory pit.

12. A reading/writing apparatus according to claim 11, wherein said controlling means includes means for determining which one of the land-shaped and groove-shaped areas is to be selected, by calculating an address supplied from the exterior of the apparatus; and means for sending the determination result to said selecting means.

13. A reading/writing apparatus according to claim 11, wherein said generating means is arranged on the same side as said initializing means with respect to the disk.

14. A reading/writing apparatus according to claim 11, wherein said generating means is arranged on a side opposite to said initializing means intervening a portion of the disk therebetween.

15. A reading/writing apparatus according to claim 10, wherein said rotating means includes means for performing phase-locked loop control.

16. A reading/writing apparatus according to claim 10, further comprising:
means for writing address information and data information to said memory pit using a laser beam.

17. A reading/writing apparatus according to claim 10, further comprising:
means, coupled to said optical means, for detecting an error in the position of said optical means moved by said moving means with respect to the position of said memory pit, so as to provide an error signal;

means for phase-inverting the error signal from said detecting means to provide an inverted error signal; and means for selecting either of the error signal from said detecting means and the inverted error signal from said phase-inverting means in response to a selection control signal obtained from said controlling means, such that the error signal is selected when said moving means moves the position of said radiating means in accordance with position information of said land-shaped areas, and that the inverted error signal is selected when said moving means moves the position of said radiating means in accordance with position information of said groove-shaped areas.

* * * * *

UNITED STATES PATENT AND TRADEMARK OFFICE
CERTIFICATE OF CORRECTION

PATENT NO. : 5,199,022
DATED : March 30, 1993
INVENTOR(S) : Katsumi Suzuki et al.

It is certified that error appears in the above-indentified patent and that said Letters Patent is hereby corrected as shown below:

Claim 1, column 8, line 59-60, change "magnetic, film" to --magnetic film--.

Claim 2, column 9, line 6, after "groove-shaped", insert --areas--.

Claim 10, column 9, line 42-43, change "magnetooptical" to --magneto-optical--.

Claim 11, column 10, line 31, change "land shaped" to --land shaped--.

Signed and Sealed this

Thirteenth Day of December, 1994

Attest:

BRUCE LEHMAN

Attesting Officer          Commissioner of Patents and Trademarks